April 8, 1941.  D. EDGAR  2,237,416
CUTTING MACHINE
Filed Jan. 23, 1939  6 Sheets-Sheet 1

INVENTOR
David Edgar
By his attorney

April 8, 1941.　　　　　D. EDGAR　　　　　2,237,416
CUTTING MACHINE
Filed Jan. 23, 1939　　　6 Sheets-Sheet 4

INVENTOR
David Edgar
By his attorney

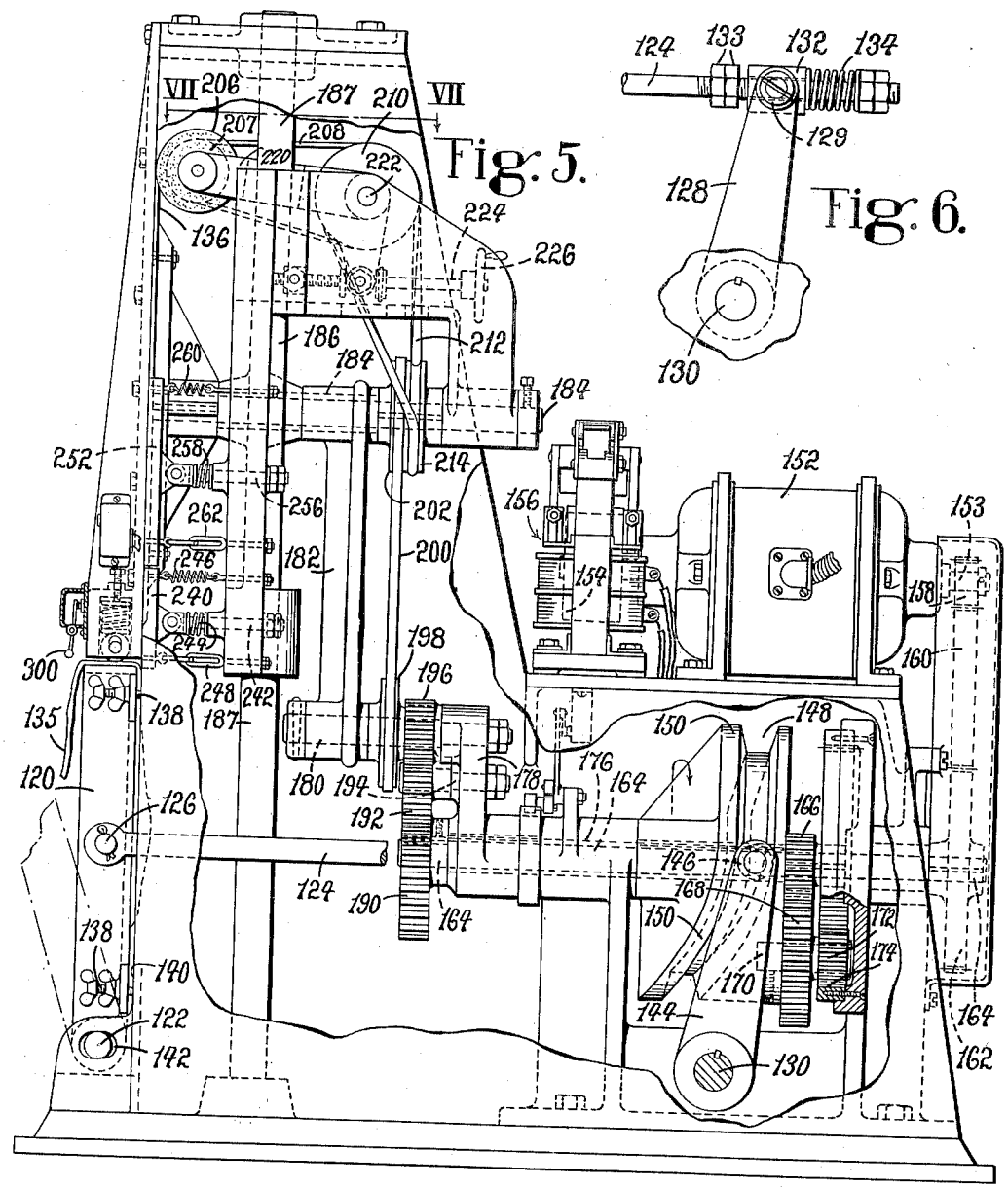

April 8, 1941.                D. EDGAR                2,237,416
                           CUTTING MACHINE
                         Filed Jan. 23, 1939            6 Sheets-Sheet 6
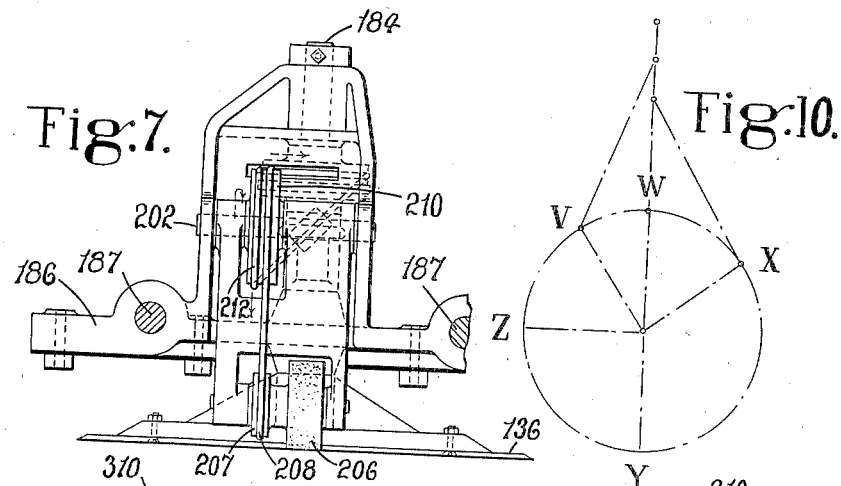
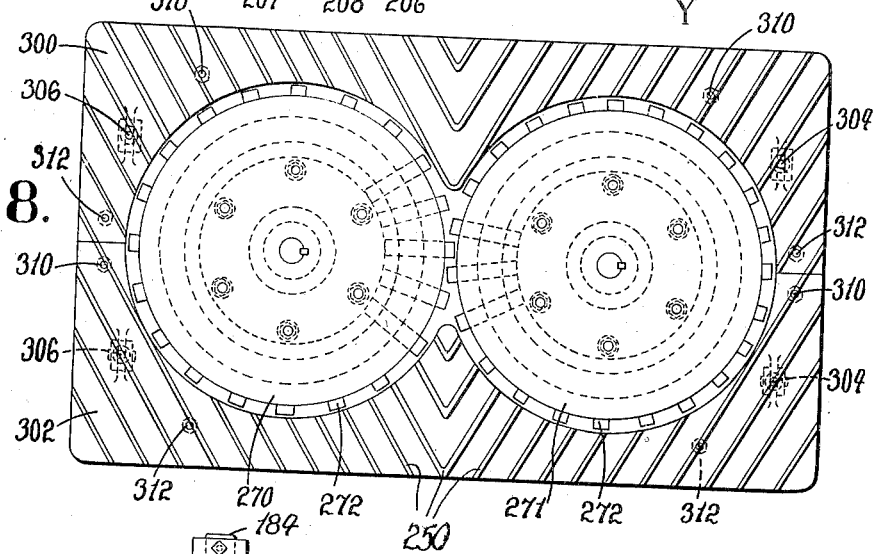
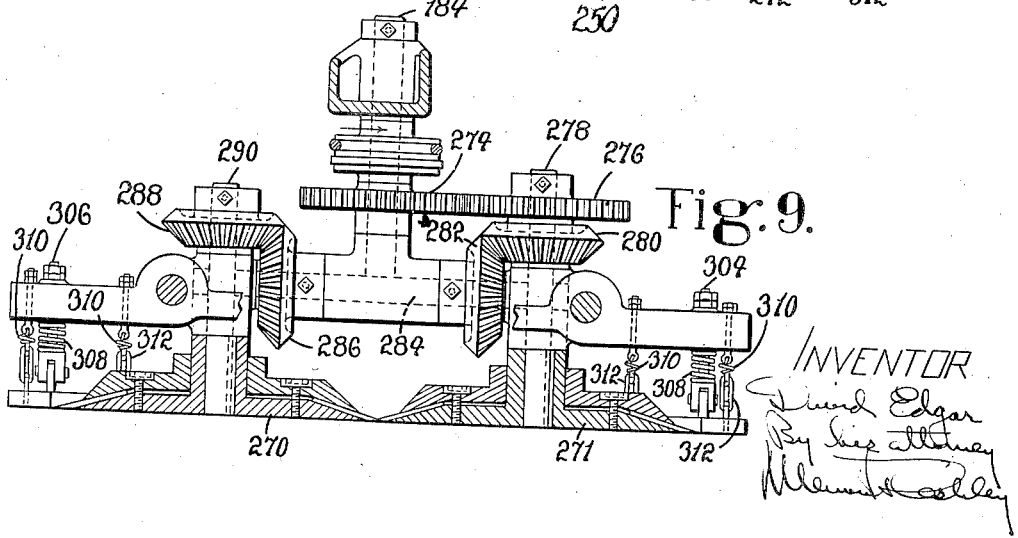

Patented Apr. 8, 1941

2,237,416

UNITED STATES PATENT OFFICE 2,237,416

CUTTING MACHINE

David Edgar, Lynn, Mass., assignor to The Tanning Process Company, Boston, Mass., a corporation of Massachusetts Application January 23, 1939, Serial No. 252,365

18 Claims. (Cl. 149—17)

This invention relates to cutting machines and is illustrated as embodied in a machine having a rotary disk cutter for slicing a portion from a hide, skin or piece of leather to reduce the thickness thereof. It is to be understood, however, that the invention and certain important features thereof may have other applications and uses.

As heretofore constructed, cheeking machines have commonly embodied a stationary, straight-edged knife against which the hide or skin is pulled by suitable feeding means. This has never been a very effective machine but has been accepted quite generally because of its cheapness. From the standpoint of good clean cutting of the work pieces, probably the most efficient of the cheeking machines now in use in this country and abroad is one of the belt knife type which ordinarily performs excellent work. However, but few are in use, partly because of the outlay involved in the purchase and maintenance of such a machine, and because of the effort and attention required to effect proper adjustment of certain working parts in these commercial machines.

It is an object of this invention to provide a highly efficient machine for slicing portions from a hide or skin which will nevertheless be relatively inexpensive to construct and to service.

It is an important feature of the invention that a rotary disk cutter is provided as the cutting element for cheeking a hide or skin and that means is provided for spreading portions of the hide or skin closely in advance of the disk cutter whereby such portions of the work are not only pressed against a work backing surface to insure proper positioning of the work for the cutting operation but they are kept under proper tension to insure clean cutting, thereby leaving the treated portions of the work piece of a uniform thickness after the removal of the sliced off portion.

As illustrated, means is provided for causing relative approaching and separating movements of the work support and disk cutter in a direction normal to the plane of the cutter to facilitate the introduction of work pieces for treatment by the disk cutter and the subsequent removal of the treated work piece.

In a preferred embodiment of the invention, the work support is a pivotally supported member which is yieldingly moved into work cutting position, the latter being determined through the co-operation of a stationary abutment and stops carried by the work support, and the work support being loosely mounted on its pivots to permit perfect vertical alinement of the work support through the co-operation of said abutment and stops. For co-operation with the work support there is provided a presser or clamping member which yields upwardly as the work support moves into work presenting position, whereby the work piece is clamped against an upwardly facing surface on the work support.

In another preferred embodiment of the invention, a feature of importance relates to the provision of means for moving a disk cutter in a direction normal to a stationary work backing surface and into a predetermined spaced relation with respect to said surface and then in a plane parallel to such surface whereby the cutter is caused to move along in properly spaced relation to the work backing surface to slice off excess portions from the hide, skin or other work piece.

With these and other important features and advantages in mind, the invention will now be described in detail in the specification and then pointed out more particularly in the appended claims.

In the drawings,

Fig. 5 is a view in side elevation, and partly in section, of the machine shown in Fig. 4;

Fig. 6 is a detail of the means for operating the work support of Figs. 4 and 5;

Fig. 7 is a sectional view taken along the line VII—VII of Fig. 5;

Fig. 8 is a detail of a construction in which the cutting means comprises two disk cutters;

Fig. 9 is a sectional view showing details of the driving means for the disk cutters illustrated in Fig. 8; and Fig. 10 is a diagram utilized to explain the relative positions of the work support and disk cutter.

Figure 1:
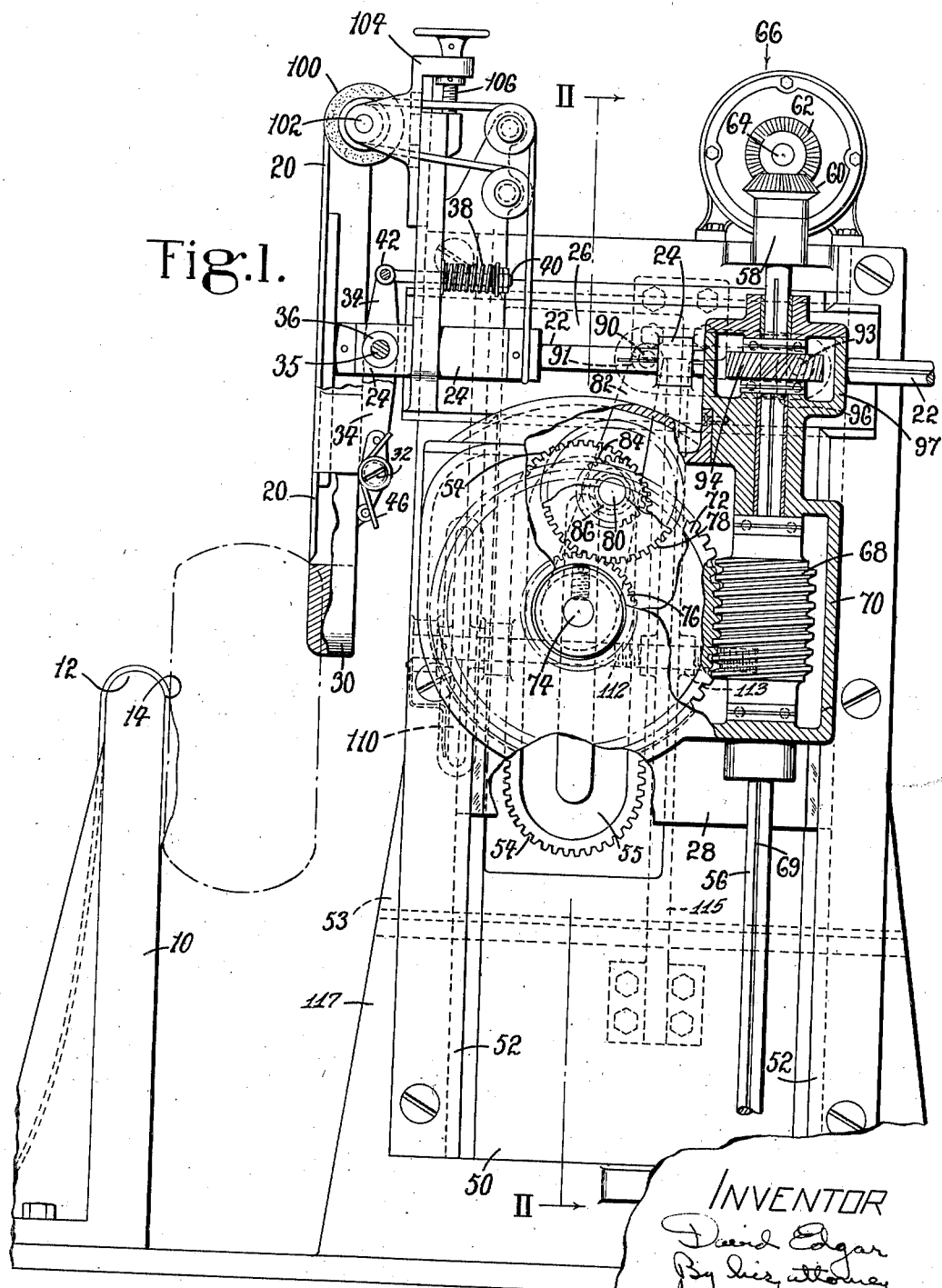
Fig. 1 is a view in side elevation and partly in section of a cutting machine illustrating one embodiment of the invention.
Figure 2:
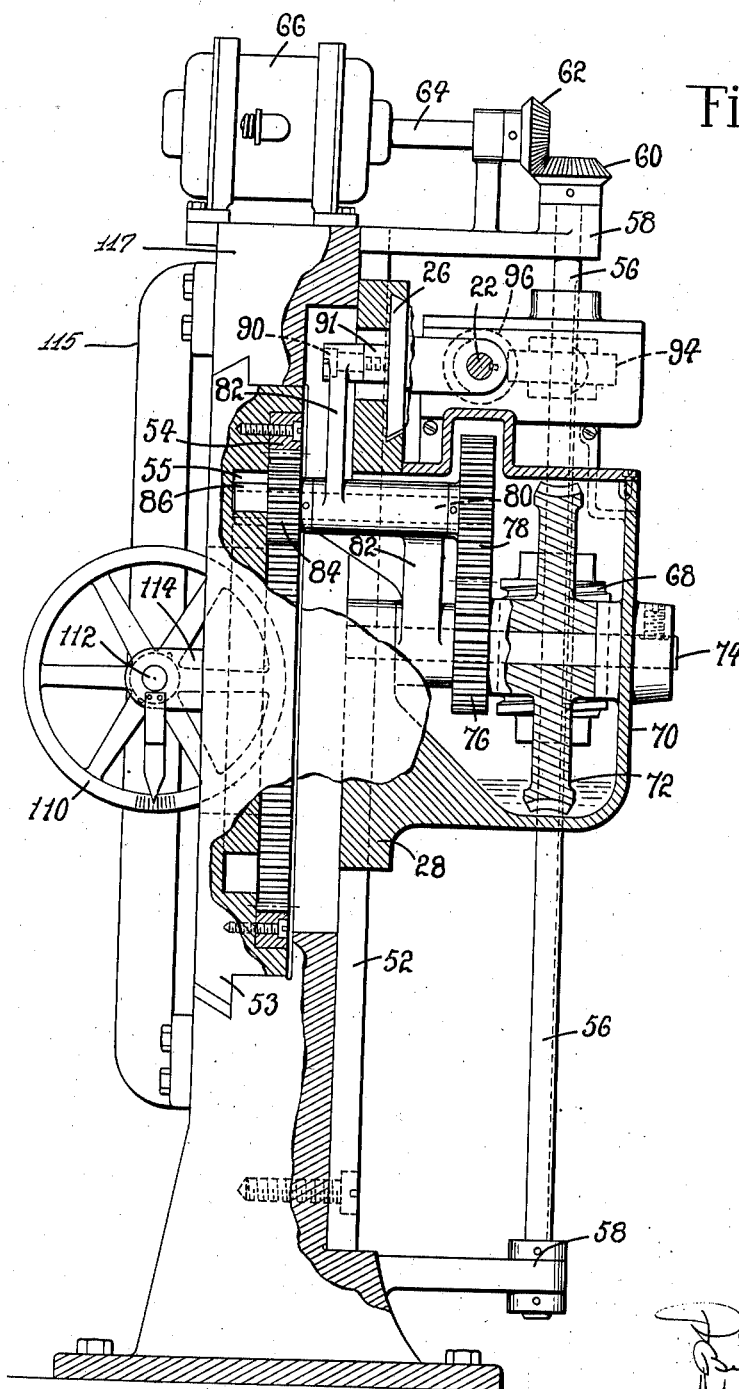
Fig. 2 is a view from the left in Fig. 1 with some of the parts shown in section along the line II—II of Fig. 1.
Figure 3:
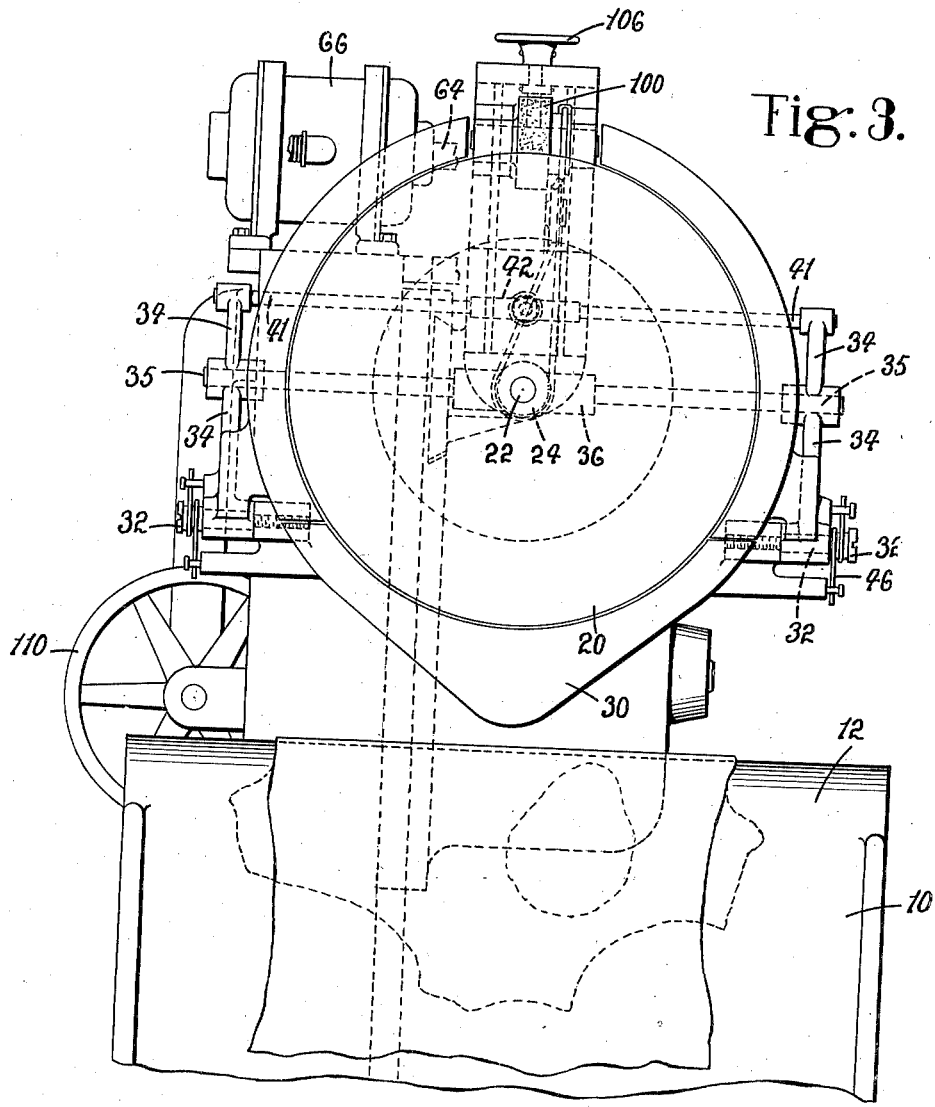
Fig. 3 is a front elevation of the disk cutter and its combined guard and work spreader.

In the machine illustrated in Figs. 1, 2 and 3, which is specially designed to perform cheeking operations upon hides and skins, there is provided a work support 10 having an upper rounded edge 12 over which a hide or skin may be folded so that the cheek portion of a hide or skin will be backed by a substantially vertical surface 14. If desired, a work clamp (not shown) may be provided to clamp the work against the upper part of the work support, thus freeing the operator from the necessity of maintaining the hide or skin in proper position on the work support.

For slicing a portion from the thick cheek and head portions of a hide positioned on the work support 10 there is provided a rotary disk cutter 20 secured to one end of a shaft 22, the shaft 22 being supported in bearings 24 carried by a knife slide or carrier 26. The knife carrier 26 is movable back and forth on a carriage 28 arranged to be moved alternately in upward and downward directions as will be hereinafter more fully described. Movement of the knife carrier 26 to the left in Fig. 1 will bring the disk cutter 20 into a vertical plane which is substantially parallel with the plane of the vertical surface 14 and closely adjacent to that plane so that as the cutter 20 descends it will slice off a portion of the cheek leaving a cheek portion on the hide of predetermined thickness. It will be readily understood that downward movement of the disk knife or cutter 20 is secured by downward movement of the carriage 28 and that the cutter continues in rotation at a high speed while it is bodily moving relatively to the work piece on the backing surface 14. At the end of its operative stroke the cutter 20 is moved to the right by a return movement of its carrier 26 and it is finally returned to its upper initial position by upward movement of the carriage 28.

For spreading the hide or skin in advance of the disk cutter 20 there is provided a work spreader 30 which is shaped substantially as an annular member concentric with respect to the cutter 20 and extending along the periphery of the disk cutter throughout an arc of 90° or more. As shown more clearly in Fig. 3, the spreader 30 is pivoted upon studs 32 carried by a lever 34 pivoted at 35 on a rigid cross bar 36 secured to or integral with the forward bearing 24. As shown, the upper end of lever 34 is urged to the right in Fig. 1 by a spring 38 on a rod 40 one end of which is pivoted at 42 to the middle of a cross bar 41 joining the upper ends of the levers 34. The lever arms 34 carry at their lower ends springs 46 which tend constantly to force the guard 30 to the left in Fig. 1 whereby the spreader 30 is held yieldingly against the work piece backed by the surface 14 on the work support 10 to present its convexly shaped edge edgewise to oncoming portions of the work piece to spread the latter in directions transverse of the direction of relative movement between the spreader and work piece. It will be clear that the work spreader 30 also serves as a guard for the knife or cutter 20.

As shown most clearly in Fig. 1, the carriage 28, which supports the knife or cutter carrier 26, is mounted for vertical movement in a stationary guideway member 50 provided with guiding ribs 52 for the carriage 28. Secured to an adjustable supporting member 53 is an elliptical rack 54 and a cam path 55, the rack forming part of a gear mechanism for moving the carriage 28 alternately in upward and downward directions. Preferably, the source of power is a shaft 56 mounted in bearings 58 and having at its upper end a bevel gear 60 arranged in mesh with a co-operating bevel gear 62 on the motor shaft 64 of a motor 66. Keyed to the shaft 56 is a worm 68, the keyway 69 of which is relatively long to provide for movement of the worm 68 with the up and down movements of the carriage 28, the worm being in a housing 70 integral with the carriage 28 and slidable on the shaft 56. Meshing with the worm 68 is a worm gear 72 secured to a shaft 74 mounted in bearings in the carriage 28. Also secured to the shaft 74 is a pinion 76 arranged to be constantly in mesh with a gear 78 fixedly secured to a stub shaft 80 rotatable in bearings carried by a lever 82 the lower end of which is pivoted on the shaft 74. Also secured to the stub shaft 80 is a pinion 84 arranged to mesh with the teeth of the elliptical rack 54, the pinion 84 being maintained in operative relation to the rack 54 by a guide roll 86 (on shaft 80) which travels along a guiding or cam slot 55 in the supporting member 53, the guiding slot 55 bearing a fixed relation to the elliptical rack 54 which is also carried by the supporting member 53. Since the pinion 84 is driven while in mesh with the elliptical rack 54, the carriage 28 is caused to move alternately in an upward and downward direction. Furthermore, as the shaft 80 is carried by the lever 82, the said lever is rocked first in one direction and then in the other as the pinion 84 travels about the ends of the elliptical rack 54. At its upper end the lever 82 is pivotally connected at 90 to a link 91 pivoted at 93 to the knife or cutter carrier 26. Hence, the cutter is moved at the proper time to the left in Fig. 1 to bring it into a plane closely adjacent to the plane of the surface 14 on the work support 10 and subsequently to the right away from the work support 10 at the end of cutting operations on the cheek portion of a hide. It will be readily understood then that movements of the knife or cutter 20 in an upward and downward direction are provided by corresponding movements of the carriage 28 in the guideway member 50, while movements of the knife or cutter 20 toward the left and subsequently toward the right in Fig. 1 are caused by sliding movements of the carrier 26 on the carriage 28 due to rocking movements of the lever 82.

Conveniently the cutter shaft 22 is driven at relatively high speed by means of a spiral gear 94 keyed to the shaft 56 by a keyway which permits the requisite up and down movement of the spiral gear on the shaft 56 while said gear is moving with the carrier 26 in its up and down movements with the carriage 28. Meshing with the spiral gear 94 is another spiral gear 96 keyed to the shaft 22, the keyway providing for movement of the shaft 22 in directions to the right and left in Fig. 1 while the spiral gear 96 remains in mesh with the spiral gear 94, this relative movement of the spiral gears being secured by their enclosure in a housing 97 secured to the carriage 28. It follows that the shaft 22 may be driven constantly at high speed although the cutter may be moving vertically or horizontally or in a combination of these two.

For keeping the cutter 20 sharp, there is provided a grinder 100 mounted on a shaft 102 carried by a slide 104 which may be adjusted by screw threaded member 106 so as to maintain proper contact between the grinder 100 and the edge of the disk cutter 20.

For adjusting the member 53 there is provided a hand wheel 110 fixed to a shaft 112 (Figs. 1 and 2) which carries a threaded portion in an interiorly threaded boss 113 (Fig. 1) in a bracket 115 extending laterally from the stationary frame 117, it being understood that the shaft 112 is fixed against endwise movement in an arm 114 (Fig. 2) extending laterally from the movable member 53, the shaft 112 being rotatable in a bearing in said arm 114. Since rotation of the shaft moves it axially of the boss or bearing 113, the member 53 is adjusted by such rotation. Adjustment of the member 53, which supports the rack 54 and the guiding slot 55 for the roll 86 on the lever 82, results in adjusting the throw of the lever 82 and therefore of the cutter carrier 26 to which lever 82 is pivoted by link 91. In this way, adjustment is secured between the disk cutter 20 and the backing member 10.

Figure 4:
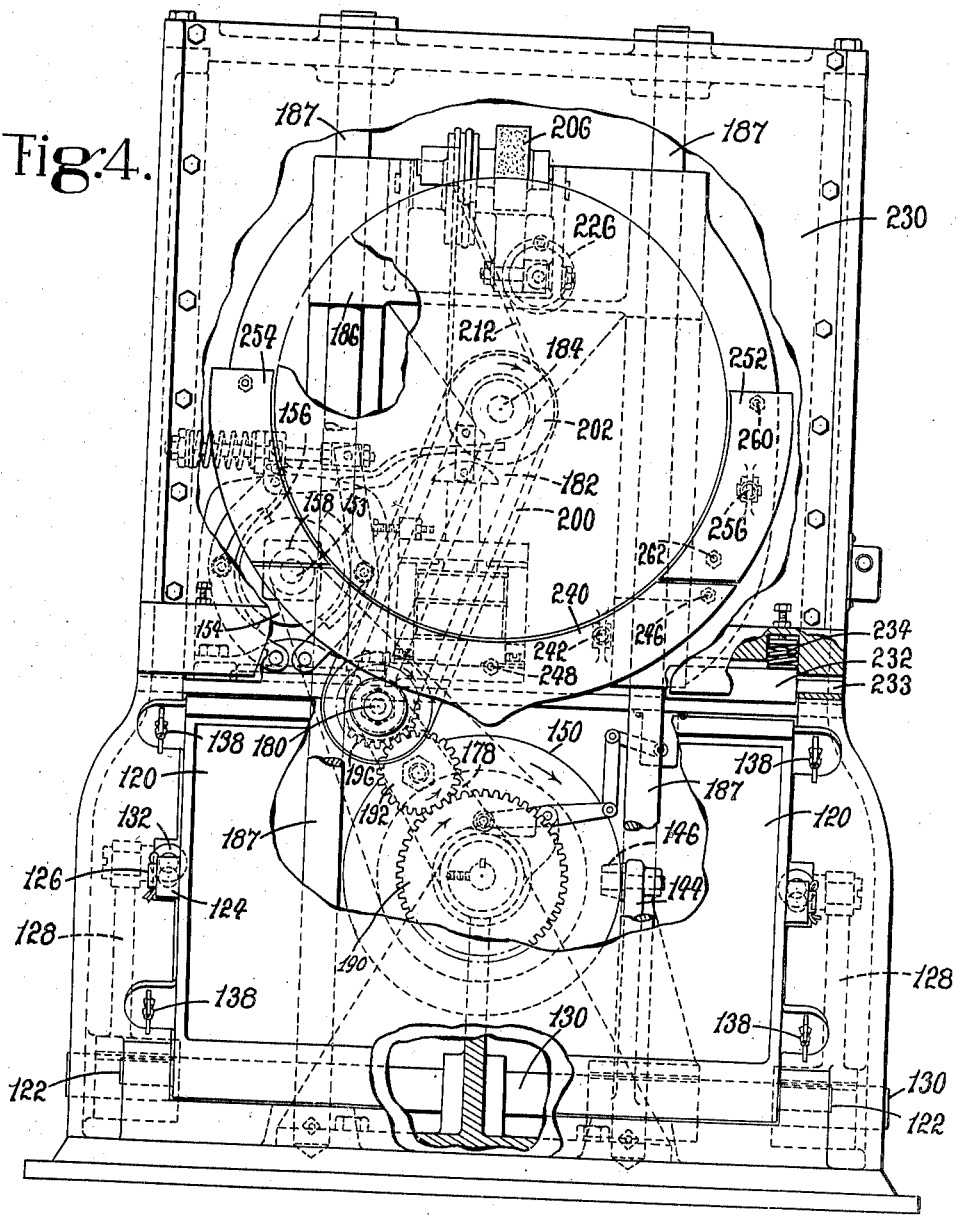
Fig. 4 is a front elevation, partly in section, of another embodiment of the invention.

In that embodiment of the invention shown in Figs. 4 and 5 of the drawings, a movable work support 120 is provided, the arrangement being such that it may move to open or work receiving position about its pivot shaft 122, the support 120 being subsequently movable to work presenting position as shown in Fig. 4. Preferably, power means is provided for moving the work support 120 into and out of operative position, the said means comprising a pair of rods 124 each pivoted at 126 to a side bar of the support and yieldingly connected at its rear end to the upper end of an arm 128, the arms 128 being fixed at their lower ends to a rotary shaft 130 mounted in the frame of the machine. Each arm 128 has swiveled thereto at its upper end (by a shoulder screw 129) a block 132 to receive slidably the rear end of the rod 124. In front of the block 132 the rod 124 is provided with a nut and nut-block 133 to co-operate with the block 132 when the arms 128 swing to the left in Figs. 5 and 6 to cause movement of the work support 120 to work receiving position. On the other side of the block 132 is a spring 134 located on the rod 124 between said block and a nut on the end of the rod, the arrangement being such that, as the arms 128 swing to the right into the position shown in Figs. 5 and 6, the work support 120 is pulled yieldingly into the position wherein a work piece 135 carried by the support is properly located for the operation of a disk cutter indicated at 136. For limiting adjustably the inward movement of the work support 120, there are provided a plurality of winged set screws 138 mounted in the support 120 at each side edge thereof and adapted to contact a forwardly facing surface 140 on the frame of the machine. In this connection it is to be noted that the lower end of the work support 120 has at each side a transversely elongated slot 142 for the reception of the ends of the shaft 122. This permits proper vertical positioning of the work support 120 under the action of the rods 124 and power operated arms 128. For operating the arms 128 and 130, there is provided a third arm 144 rigid on the shaft 130 and having at its upper end a cam roll 146 movable along a cam slot 148 in a cam wheel 150 arranged to be driven from any suitable power means.

In the illustrated construction, the power means mentioned above is shown as an electric motor 152 having an armature shaft 153 one end of which is provided with a collar 154 rigidly secured thereto and adapted to be gripped by an electrically operated brake mechanism 156 of a well-known construction. At its other end the armature shaft 153 carries rigidly secured thereto a pulley 158 about which passes a belt 160 which also passes around a pulley 162 rigidly secured to a shaft 164, the latter being driven at (for example) 151 R. P. M. Secured to the shaft 164 is a small pinion 166 which is constantly in mesh with a gear 168 rotatably mounted on a stud shaft 170 rigidly carried by the cam wheel 150. Secured to the gear 168 (to rotate with it) is a pinion 172, the latter being constantly in mesh with the teeth upon an internal gear 174 secured rigidly to the frame of the machine. It will be clear, therefore, that the cam wheel 150 is driven from the shaft 164 through the epicyclic train just described, the rotation of the cam wheel 150 being about 13 R. P. M. This means that the work support 120, which is operated from the cam wheel 150, is moved between work receiving and work presenting positions at the rate of about thirteen times per minute.

In order that the disk cutter 136 may be moved downwardly to operate on the work and be returned to its initial position, in timed relation to the movements of the work support 120, the cam block 150 is utilized to drive the means for causing such up and down movements of the disk cutter. As illustrated, the cam wheel 150 is secured to a hollow shaft 176 which surrounds the shaft 164. Fixed to the end of the hollow shaft 176 is a crank arm 178 which carries rigidly secured thereto a short shaft 180 having rotatably mounted on one of its ends the lower end of a link 182, the upper end of which is pivotally mounted on a bearing for a shaft 184, the said bearing projecting from a carriage 186 which supports the shaft 184, the latter being the power shaft for the disk cutter 136. It will be clear that, upon rotation of the crank arm 178, the carriage 186 and with it the disk cutter 136 is moved up and down on guide posts 187 in timed relation to the cam wheel 150. It is clear that the crank arm 178 makes the same number of revolutions as the cam wheel 150.

Since the disk cutter 136 and its shaft 184 must be driven at a relatively high rate of speed, they are preferably driven through suitable connections to the shaft 164. As shown, there is provided a gear 190 secured to the shaft 164 and arranged to be constantly in mesh with a pinion 192 rotatable on a stub shaft 194 carried by the crank arm 178. The arrangement further provides a pinion 196 rotatable on the shaft 180 and arranged to be driven by the pinion 192. Secured to and rotatable with the pinion 196 is a pulley 198 about which passes a belt 200 the other end of which also passes about a pulley 202 secured to the cutter shaft 184. Through this train of driving connections the cutter shaft is driven at about 427 R. P. M.

Means is preferably provided for keeping the disk cutter 136 in sharpened condition, the said means comprising in the illustrated construction an emery wheel 206 having secured thereto a pulley 207 arranged to be driven by a belt 208 which passes over a pulley 210 secured to a pulley conveniently of the same size driven by a belt 212 from a pulley 214 secured to the cutter shaft 184. As shown, the emery wheel 206 is mounted on a shaft at the end of an arm 220 pivoted at 222 and having a downwardly extending arm which carries a block swiveled thereto through which passes an adjusting shaft 224 provided with a hand wheel 226. Upon rotation of the hand wheel 226 and of the shaft 224, the arm 220 may be adjusted to keep the emery wheel in proper relation to the edge of the disk cutter 126. It will be clear that the emery wheel keeps the disk cutter in properly sharpened condition during the operation of the machine, the arrangement being such that the emery wheel may be left for any desired length of time to operate on the disk cutter and that it may be readily removed therefrom to inoperative position by turning the hand wheel 226.

Upon inspection of Fig. 4, it will be observed that the disk cutter 136 is completely covered at the front of the machine by a cover member 230, which is conveniently secured in place by bolts and nuts so that it may be removed to give access to the cutter for repair and replacement purposes. At the lower end of this cover member 230, there is mounted for vertical movement thereon a presser member 232 having at each end a projection 233 which is slidably engaged in a vertical slot adapted to permit upward movement of the presser member against a spring 234 housed in the cover member at each end of the presser member. As will be readily understood, the projections 233 on the presser member, in their respective slots, also limit the downward movement of the presser member under the action of the springs 234. While the work support 120 is moving into work-presenting position with respect to the cutter 136, the presser member 232 yields upwardly while at the same time serving to clamp the work piece on the upwardly facing surface of the work support 120.

There is preferably provided, in association with the disk cutter 136, a spreader means adapted to engage the work piece in advance of the disk cutter to spread the work piece out under suitable tension, as a preliminary to the cutting or slicing operation by which a portion is cut or sliced from the overthick portion of the work piece. As shown, this spreader means comprises three separate members, of which the lower 240 is pivotally mounted upon the end of a pair of horizontally spaced rods, one of which is shown at 242 slidably mounted in the carriage 186, a spring 244 being provided on the rod 242 to hold the spreader member 240 yieldingly in its operative position. Adjacent to the upper end of the spreader member 240, a pair of springs 246 are secured thereto at one end and at their other ends to the carriage 186, the springs 246 tending constantly to pull the lower end of the presser member in a direction toward the adjacent surface of the cover member 230 and toward the vertical work-backing surface of the work support 120 as the spreader means and cutter are being moved downwardly. To resist the springs 246, there is provided a pair link members 248 which, in co-operation with the spring 246, normally hold the spreader member 240 in a vertical plane. When the lower end of the spreader member 240 engages a work piece on the work support 120 during downward movement of the carriage 186, the lower end of the presser member may yield to the right against the action of the springs 246. During continued downward movement of the spreader member 240, the whole member may yield to the right in Fig. 4 against the action of the springs 244 on the rods 242, it being understood in this connection that the springs 244 are strong enough to secure spreading action by blades on the operative surface of the spreader member, which blades may be similar to blades 250 of Fig. 8.

In order to keep the work piece properly spread out on each side of the disk cutter 136, there are provided two additional spreader members 252, 254, one at each side edge of the cutter 136. Each of these spreader members is supported in a manner similar to that of the spreader member 240. For example, the spreader member 252 is pivotally mounted upon a retractable rod or rods 256 having a spring 258 thereon which yieldingly resists movement of the spreader member 252 in a direction away from the disk cutter 136. Near the upper end of the spreader member 252 there is a spring 260 which in co-operation with a link member 262 keeps the presser member 252 with its operative face in a vertical plane. At the same time the spring 260 and the link member 262 permit an angular position of the spreader member 252 as the lower end of the latter engages the work piece.

As will hereinafter be described, the work support 120 moves away from the disk cutter 136 and away from the spreader members before the cutter and these members start to move upwardly in their return to initial position, the purpose being to avoid drawing the spreader members over the work piece while they are still being pressed against the latter, thereby avoiding displacement of the work piece and possible damage thereto.

While a single disk cutter 136, of a size to operate effectively on work pieces of the largest size, may be readily obtained from manufacturers supplying the market, it may be advantageous under certain circumstances to employ two or more smaller disk cutters, in which case they are conveniently mounted on the carriage 186 and arranged in the manner shown in Figs. 8 and 9. As shown, the disks 270, 271, may be provided with individual adjustable blades 272 in spaced relation about the periphery of each disk, the blades of one disc being arranged in such manner as to project into the space between two adjacent blades on the co-operating disk, thereby permitting the cutting surfaces to be so closely positioned, that is, in an interlocking relation, that all portions of the work piece will be operated upon during the descent of the cutting members or disks 270, 271.

For driving the disks 270, 271, the shaft 184 is provided with a gear 274 which is constantly in mesh with a gear 276 on a secondary shaft 278 which fixedly carries the disk member 271 and also a bevel gear 280 in mesh with a bevel gear 282 secured on a shaft 284, which fixedly carries a bevel gear 286 in mesh with a bevel gear 288 secured to a shaft 290 at the axis of the second disk member 270, whereby both disk members are driven in opposite directions at the same speed.

As indicated in Fig. 8 of the drawings, spreader members 300, 302 are provided in connection with the cutter disks 270, 271 to spread a piece of work such as a hide or skin into extended condition as a preliminary to a slicing operation thereon. Conveniently each spreader member 300, 302 is pivotally mounted at the ends of a pair of spring pressed plungers 304, 306, springs 308 on the plungers serving to hold the spreader members yieldingly in a plane which is slightly beyond that of the plane of the cutter disks in the direction of the work support. Each spreader member may also tip about its pivotal support on the plungers 304, 306 and each is normally maintained in a vertical plane through the co-operation of a spring 310 and a link member 312 at each end of each spreader member, the arrangement being substantially that shown in connection with the spreader member 243 in Fig. 5 of the drawings. By this arrangement each spreader member may yield away from the work support by tipping about its pivotal supports on the plungers 304, 306 as well as by the yielding of the plungers 304, 306.

Upon reference to Fig. 10 of the drawings, it will be observed that the line V indicates the position of the crank arm 178, and therefore of the cutter disk 136, when the work support 120 is in work-receiving position, this being the stop position of the machine. When the machine is started by turning on the current for the motor 152, the crank arm 178 moves to the position W, the effect being to lift the carriage 186 and the disk cutter 136 in an upward direction in order to give time for the work support 120 to move to its closed or work-presenting position. By the time the work support has moved into such position, the crank arm 178 has reached the position X (Fig. 10), thereby bringing the disk cutter 136 below the starting position which it occupied at the V position of the crank arm 178, so that it is ready to begin the cutting operation as soon as the work support 120 has reached its fully closed position. In the continuation of the rotation of the crank arm 178, the carriage 186 and the disk cutter 136 are moved downwardly until they reach the low point of the crank arm 178 indicated at Y, whereby the slicing operation on the work piece is performed. In the continuation of such rotation of the crank arm 178, the disk cutter 136 and its carriage are moved upwardly, the timing being such that, by the time the crank arm 178 reaches the position Z, the work support is completely open to work-receiving position, it being understood in this connection that the work support 120 starts to open promptly at the beginning of the upward movement of the carriage 186 and disc cutter 136 in order that the spreader members will not be dragged over the surface of the treated work piece. As indicated above, the crank arm 178 continues on to the position of the line V, which is the stop position of the machine, so that the lower end of the disc cutter 136 is substantially above the lower end of the presser member 232 and therefore not in a position to be contacted by the hand of the operator.

As a safety device there is provided a bail member 300 pivoted on the front of the cover member 230, the said bail member having a horizontal rod portion extending the full width of the work support 120 and so located that the hand of the operator will contact the bail member 300 if he carelessly keeps his hand on that portion of the work piece resting over the upper end of the work support. Upon contacting the pivoted bail member 300, the latter is moved to effect a break in the electrical circuit which controls the motor 152. The latter is stopped immediately through the electrical brake 156, thereby insuring against the possibility of any injury to the operator, it being recalled in this connection that the first movement of the disk cutter from its "stop" position is in an upward direction.

In operating the machine shown in Figs. 4 and 5, a piece of work such as a hide or skin 135, having a portion of undesirable thickness, is so positioned on the work support 120 that the thicker portion, for instance, the cheek portion thereof, is backed by the vertical surface of the work support 120. Now, upon starting the machine, the work support moves to the position shown in Fig. 5, thus presenting the work for the operation of the disk cutter 136. Cutting or slicing of the thickened portion from the hide or skin is accomplished during downward movement of the disk cutter which is immediately followed by return movement of the disk cutter to its upper position of rest, the work support 120 moving to open or work-receiving position where the treated hide or skin may be removed and a fresh piece of work placed on the work support.

Having described my invention, what I claim as new and desire to secure by Letters Patent of the United States is:

1. In a machine for cutting a slice from the surface of a relatively pliable and foldable work piece, a member having a vertically arranged surface for backing a work piece, a disk cutter rotatable in a plane substantially parallel to said backing surface, means for causing downward movement of the rotary disk cutter in predetermined spaced relation to the backing member to effect a cutting operation on the work piece, means for predetermining the thickness to which the work piece is to be uniformly reduced by the cutting operation, and a combined work spreader and guard concentric with all of that portion of the disk cutter edge facing in the downward direction and movable with the cutter to guard said edge and to spread out the work piece in advance of the downwardly moving cutter.

2. In a cutting machine, a work support having an upwardly facing surface over which a hide or skin may be folded to be supported by said surface and also another surface in a substantially vertical plane to serve as a backing for the portion of the hide or skin to be operated upon, a rotary disk cutter in a plane substantially parallel to said vertical surface, and means for causing relative movement of translation between the cutter and the work support in a plane parallel to the backing surface on the work support to slice a portion from the hide or skin while the latter is held stationary with respect to said surfaces.

3. In a hide cutting machine, a work support having a work backing surface in a substantially vertical plane, a rotary disk cutter mounted in a plane substantially parallel to that of the work backing surface, a shaft to support and rotate the cutter, a carriage for the shaft, means for moving the carriage first in a downward direction to move the cutter downwardly in a plane parallel to the plane of said backing surface and subsequently in an upward direction to the initial position of the carriage, and means associated with the moving means for the carriage for driving the shaft of the cutter during downward movement of the carriage, whereby the cutter is caused to slice a piece from the hide or skin while the latter is backed by the work support.

4. In a cutting machine, a work support having a work backing surface, a rotary disk cutter, means for driving the cutter, and means for moving the cutter toward the plane of said backing surface and also in a plane parallel to said backing surface to cause the cutter to travel along said surface to slice a portion from a hide or skin on the work support, the last-mentioned means being also operative to return the disk cutter to its initial position.

5. In a cutting machine, a work support having a surface to serve as a backing for the portion of the hide or skin to be treated, a disk cutter rotatable in a plane substantially parallel to said backing surface, means for causing a predetermined relative approaching movement of the disk cutter and work support in a direction normal to said backing surface, and means operating in timed relation to the first-mentioned means to effect relative movement of translation between the cutter and the work support in a plane parallel to the backing surface on the work support to slice a portion from the hide or skin.

6. In a cutting machine, a work support having a work backing surface, a rotary disk cutter, a shaft to support and rotate the cutter, a carrier for the cutter shaft, a carriage for the shaft carrier, means for moving the shaft carrier on the carriage to move the disk cutter in a direction normal to said backing surface, means for moving the carriage in a direction to move the cutter along a plane parallel to the plane of said backing surface, the means for moving the carrier and carriage subsequently co-operating in moving the disk cutter in directions the reverse of those mentioned above to return the cutter to initial position, and means associated with the moving means for the carriage for driving the shaft of the cutter, whereby the cutter is caused to slice a piece from a hide or skin on the work support.

7. In a cutting machine, a work support having a work backing surface in a substantially vertical plane, a rotary disk cutter, a shaft to support and rotate said cutter, a carriage for the cutter and its shaft, means to adjust the carriage and the cutter shaft carried thereby in the direction of the length of the shaft to bring the disk cutter into the desired spaced relation with respect to the plane of the backing surface on the work support, and means for moving the carriage in a downward direction to cause the disk cutter to slice a portion from the hide or skin on the backing surface of the work support, said carriage then returning to its initial position to lift the disk cutter above the level of the work support so that the treated work piece may be removed and another substituted therefor.

8. In a cutting machine, a work support having a work backing surface in a substantially vertical plane, a rotary disk cutter in a plane substantially parallel to that of the work backing surface, a shaft to support and rotate said cutter, means to move the cutter shaft in the direction of its length to bring the disk cutter into a vertical plane substantially parallel to the plane of the backing surface on the work support, a carriage for the cutter and its shaft, gear mechanism comprising an elliptical rack for moving the carriage alternately downwardly and upwardly in a substantially vertical plane whereby the disk cutter is caused to move along the backing surface to slice a portion from the hide or skin on the work support, and a vertical shaft having secured thereto rotary gear mechanism to operate both the cutter shaft and the gear mechanism for moving the carriage.

9. In a cutting machine, a disk cutter located in a substantially vertical plane and movable in an upward and downward direction in said plane, and a work support having a vertical work-backing surface and movable to receive a piece of work and to present it with a portion thereof backed by said surface and projecting into said plane for a cutting operation by the disk cutter.

10. In a cutting machine, a disk cutter located in a substantially vertical plane and movable in an upward and downward direction in said plane, a work support movable to receive a piece of work and to present it with a portion thereof projecting into said plane for a cutting operation by the disk cutter, and a presser member located in front of the disk cutter and operative to engage yieldingly the work piece on the work support to hold it in place during the operation of the disk cutter.

11. In a cutting machine, a disk cutter located in a substantially vertical plane and movable in an upward and downward direction in said plane, a work support pivotally mounted to swing from a work receiving position to a work presenting position with respect to said disk cutter, stop members to locate the work support in work presenting position, and power means for moving the work support and the disk cutter in timed relation to each other whereby the work support is moved to work presenting position prior to the descent of the disk cutter.

12. In a cutting machine, a disk cutter located in a substantially vertical plane and movable in an upward and downward direction in said plane, a work support movable to receive a piece of work and to present it with a portion thereof projecting into said plane for a cutting operation by the disk cutter, power means for moving the disk cutter bodily upwardly and downwardly in said plane, said means comprising also means for driving the disk cutter at a high rate of speed, and means for moving the work support between work receiving and work presenting positions in timed relation to the up and down movements of the disk cutter.

13. In a cheeking machine, a pair of disk cutters located side by side in a substantially vertical plane and movable in an upward and downward direction in said plane, means for driving the cutters at high speed in opposite directions, and a work support movable to receive a piece of work and to present it with a portion thereof projecting into said plane for a cutting operation by the disk cutters, each cutter comprising a plurality of blades in spaced relation about the periphery of the cutter, and the blades of one cutter being arranged to enter the spaces between the blades on the other cutter.

14. In a cheeking machine, a disk cutter located in a substantially vertical plane and movable in an upward and downward direction in said plane, means for driving the disk cutter at high speed, a work support movable to receive a piece of work and to present it with a portion thereof projecting into said plane for a cutting operation by the disk cutter, said support having an upwardly facing surface and a vertical work-backing surface, a presser member located in front of the disk cutter and operative to engage yieldingly the work piece on the upwardly facing surface of the work support to hold it in place during the operation of the disk cutter, and a spreader member movable with the disk cutter and projecting in advance thereof to spread the work piece on the vertical work-backing surface of the work support.

15. In a cheeking machine, a disk cutter located in a substantially vertical plane and movable in an upward and downward direction in said plane, a shaft to support and drive the cutter, a carrier for the shaft and cutter, a work support pivotally mounted to swing from a work receiving position to a work presenting position with respect to said disk cutter, means for moving the work support and the disk cutter in timed relation to each other whereby the work support is moved to work presenting position prior to the descent of the disk cutter, said means comprising a main shaft having a crank thereon, a link between the crank and said carrier to move the latter up and down, and means for driving the cutter shaft comprising a pulley carried by said crank.

16. In a cutting machine, a disk cutter located in a substantially vertical plane and movable in an upward and downward direction in said plane, a work support pivotally mounted to swing from a work receiving position to a work presenting position with respect to said disk cutter, said work support being loosely mounted on its pivot, means for moving the work support yieldingly into its work presenting position, and means comprising adjusting members to determine variably the work presenting position of the work support.

17. In a machine for cutting a slice from the surface of a relatively pliable and foldable work piece, a member for backing the work piece, a rotary disk cutter in a plane substantially parallel to the surface of the work backing member, means for causing relative movement of translation between the backing member and the cutter to effect a cutting operation on the work piece, a work spreader to spread the work piece in advance of the cutter, and means arranged to support the spreader yieldingly for movement directly away from the work backing member and also for pivotal movement so that said spreader may yield directly away from said work backing member and also turn about its pivotal support.

18. In a machine for cutting a slice from the surface of a hide or skin or similar work piece, a member for backing a work piece, a rotary disk cutter, means for causing relative movement of translation between the backing member and the cutter to effect a cutting operation on the work piece, a work spreader to spread the work piece in advance of the cutter, means arranged to support the spreader yieldingly and for pivotal movement so that said spreader may yield away from said work backing member and also turn about its pivotal support, link means to limit the pivotal movement of the spreader in one direction, and spring means co-operating with the link means to hold the spreader normally in a plane parallel to the plane of the rotary disk cutter.

DAVID EDGAR.